(12) United States Patent
Dahlke

(10) Patent No.: US 6,477,468 B1
(45) Date of Patent: Nov. 5, 2002

(54) ATMOSPHERIC DENSITY MODELING PROCESS USING DATA FROM MULTIPLE SATELLITES

(75) Inventor: Scott R. Dahlke, Colorado Springs, CO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 122 days.

(21) Appl. No.: 09/648,421

(22) Filed: Aug. 28, 2000

(51) Int. Cl.[7] .............................................. G06F 169/00
(52) U.S. Cl. ................................................... 702/3
(58) Field of Search ......................................... 702/2, 3

(56) References Cited

PUBLICATIONS

Sehnal, L., et al., "MIMOSA—a satellite measuring orbital and attitudinal accelerations caused by non–gravitational forces", Advances in Space Research, vol. 23, No. 4, p. 705–714, Feb. 1999.*

Berger, Jaeck, "Statistical model of global density between 180 and 500 km (deduced from satellite drag data)", Annales de Geophysique, vol. 29, Oct.–Dec. 1973, p. 547–552.*

* cited by examiner

Primary Examiner—Donald E. McElheny, Jr.
(74) Attorney, Agent, or Firm—William G. Auton

(57) ABSTRACT

A moderate resolution model and computer coed to predict atmospheric density from data of atmospheric drag on satellites. Changes in atmospheric density are easily seen by plotting data from TLE sets, but the data is noisy and generally has many gaps in it. This new process presents a way in which data from several different satellites can be scaled to the same level and merged to form a much better model without gaps and solutions where noise values are averaged to reduce their effects. This results in a model that describes the relative changes in the atmospheric density over time. The absolute density is not modeled in this step, however, using satellites with well know drag properties, the model can be calibrated to give estimates of absolute atmospheric density if necessary. Along with the absolute values, the drag coefficients of all the satellites involved can be estimated.

1 Claim, 4 Drawing Sheets

ATMOSPHERIC DENSITY MODELING PROCESS USING DATA FROM MULTIPLE SATELLITES

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to systems which calculate the effects of the atmosphere n the transmission of radio and optical beams, and more specifically to a new process to model the atmospheric density variations. Typically atmospheric densities are estimated using models that generate predictions based on historical data, or use measurements of indirect values such as solar flux and geomagnetic measurements as input to a model to get values for high altitude atmospheric density. These indirect values are used in lieu of direct measurements of the upper atmosphere. Examples of computer models of the atmosphere are shown in the following U.S. Patens, the disclosures of which are incorporated herein by reference:

U.S. Pat. No. 5,315,513, May 24, 1994, System for modeling moderate resolution atmospheric propagation, Abreu, Leonard W.

U.S. Pat. No. 5,281,815, Jan. 25, 1994, Method of determining the humidity and temperature of atmospheric air, Even-Tov, Ori, and U.S. Pat. No. 5,075,856, Dec. 24, 1991, System for modeling low resolution atmospheric propagation, Kneizys, Francis X.

SUMMARY OF THE INVENTION

Typically atmospheric densities are estimated using models that generate predictions based on historical data, or use measurements of indirect values such as solar parameters as input to a model to get values for high altitude atmospheric density. This new process uses readily available estimates of drag from satellites' orbital elements to form a model of the atmospheric density changes. The source of the measurements used in the development of this process was from NORAD "Two Line Element (TLE)" sets, but the process is not limited to data from this source.

Changes in atmospheric density are easily seen by plotting data from TLE sets, but the data is noisy and generally has many gaps in it. This new process presents a way in which data from several different satellites can be scaled to the same level and merged to form a much better model without gaps and solutions where noise values are averaged to reduce their effects. This results in a model that describes the relative changes in the atmospheric density over time. The absolute density is not modeled in this step, however, using satellites with known know drag properties, the model can be calibrated to give estimates of absolute atmospheric density if necessary. Along with the absolute values, the drag coefficients of all the satellites involved can be estimated.

This is a potentially better model of the atmospheric density than other models, because it is a direct observation of the atmospheric density's effects instead of estimating the density based on less direct measurements.

It is an object of this invention to provide:

1) improved estimate of orbital parameters (coefficient of drag) for satellites 2) more accurate prediction of satellite positions in the future 3) better understanding of the atmospheric changes over time 4) basis for comparing solar interaction with the atmosphere 5) enhanced ability to predict satellite lifetimes These and many other objects and advantages of the present invention will be readily apparent to one skilled in the pertinent art from the following detailed description of preferred embodiment of the invention and the related drawings.

DETAILED DESCRIPTION OF THE PREFERRED EMBODIMENT

This new process uses readily available estimates of drag from satellites' orbital elements to form a model of the atmospheric density changes. The source of the measurements used in the development of this process was from NORAD "Two Line Element (TLE)" sets, but the process is not limited to data from this source. These types of measurements are values derived directly from the region of interest in the atmosphere.

The part of the data from the TLE sets that is used for this method is the parameter known as B* or BSTAR. It is a drag term estimated in the processes of generating the TLE's. In this paper the satellite's ballistic coefficient, B, is defined as:

$$B = \frac{C_D A}{m}$$

where $C_D$ is the coefficient of drag, A is the cross sectional area and m is the mass. The B* term is then defined as:

$$B^* = \frac{B}{2}\rho_0$$

where $\rho_0$ is the value of the atmospheric density at some reference altitude. So, when the B* term is estimated at each time point, the effects of the parameters $C_D$, A, m and $\rho_0$ are all lumped together. If B* changes from one time point to the next it is not known which of the four parameters caused the change. However, in many cases $C_D$, A and m are relatively constant and the changes in B* can be directly attributed a change in the atmospheric density $\rho_0$. Later in the process a method is presented to identify satellites where parameters other than $\rho_0$ change significantly. But for now it is assumed that for a given satellite the changes in B* are due solely to changes in $\rho_0$.

In order to estimate the variations in the density it would be nice to have some function, like a sine curve, to fit the data to using a least squares method. However, the variations that are encountered in the density don't tend to follow a convenient function over short time spans. Therefore the following method was developed in order to generate a model that follows the erratic nature of the changes.

Figure 1:
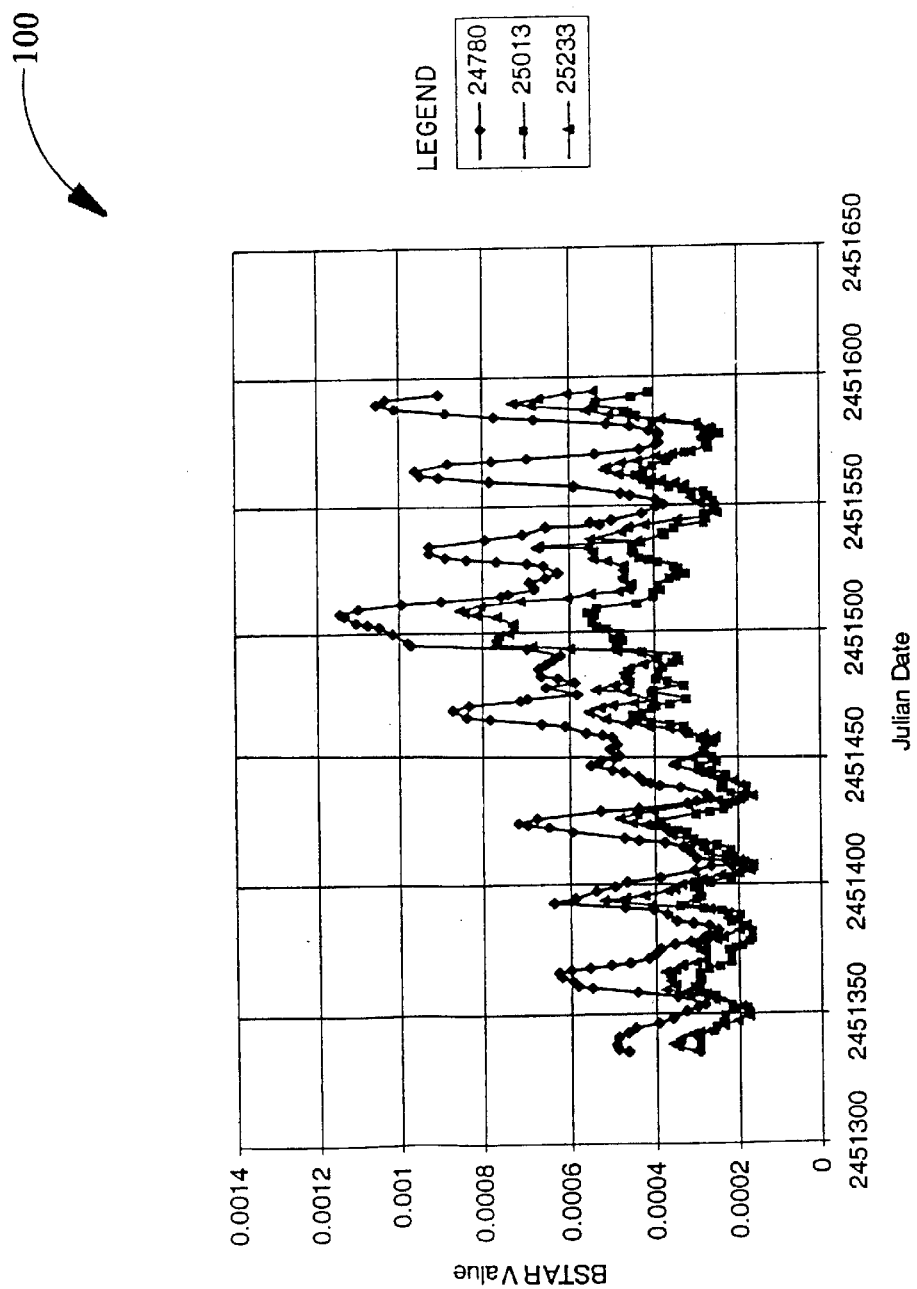
FIG. 1 is a chart of BSTAR values.

If drag data from several satellites are viewed together, they exhibit the same trends. However, they differ by some scale factor, mainly due to the fact that the ballistic coefficients are different (see FIG. 1). The 5 digit numbers are the NORAD identification numbers for the satellites.

To begin the process, the atmospheric model is initialized with the false assumption that the atmospheric density is constant over the time span of interest. The model consists of a number of points spread across a specified number of days all with a value of 1.0. To get a density value between time points, a linear interpolation is done (which at this point isn't difficult since all the values are initialized to 1.0).

Then for each satellite B* terms from the TLE's are scaled up or down by some factor to match the current model. Then an overall scale factor for each satellite is found by taking the average value of the individual scale factors across all the points for a specific satellite, $F_i$.

Figure 2:
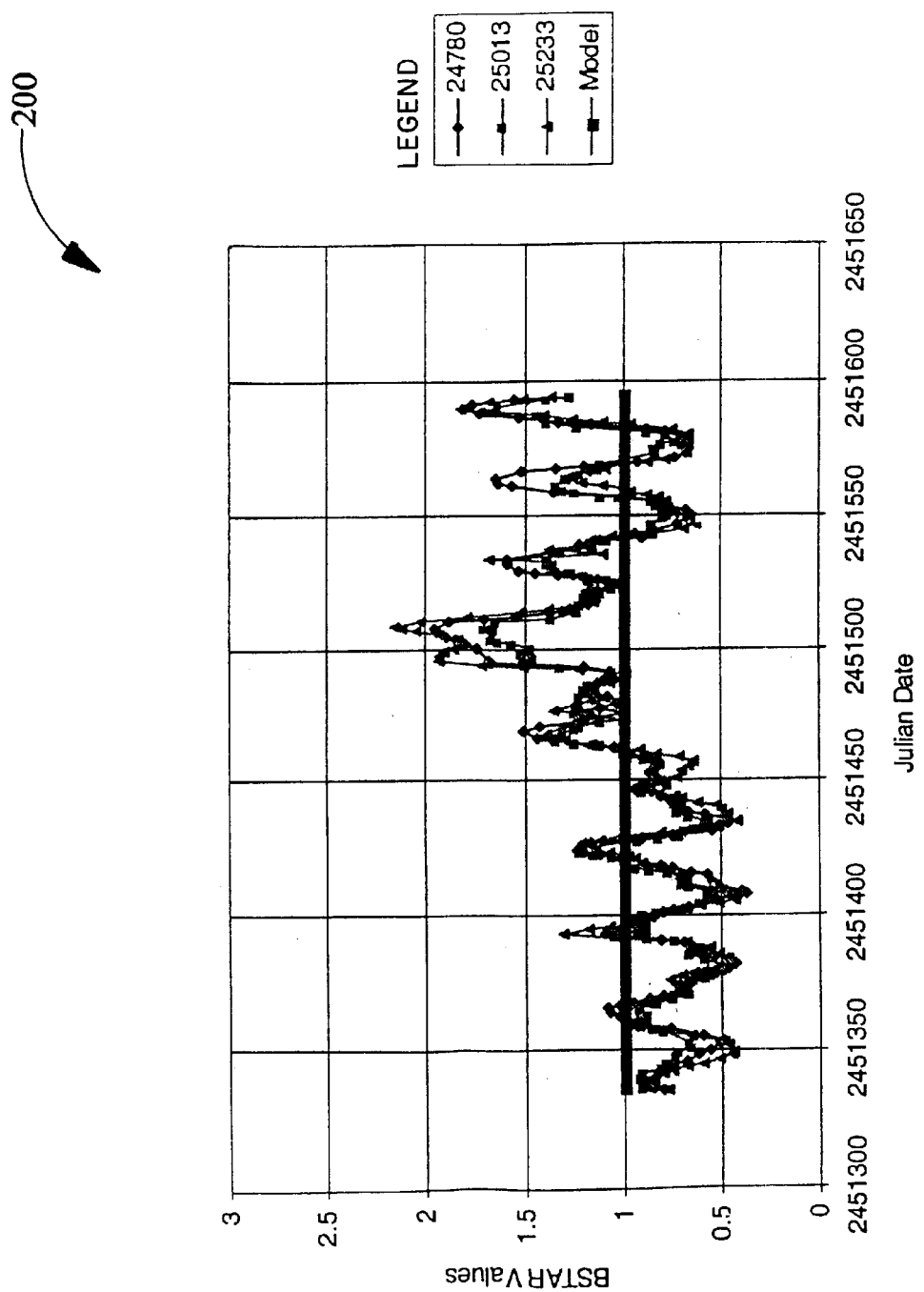
FIG. 2 is a chart of results from scaling all satellite data so they come closest to fitting the current best model.

FIG. 2 shows the results of scaling all of the satellites so that they come closest to fitting the current best model.

Once this has been done for all of the satellites to be used in the model, these scaled drag terms of each satellite are averaged together to generate a better estimate of the density model. Also in this step the model is normalized so that the first time point has a value of 1.0. This is done by multiplying the first time point by the factor necessary to increase or decrease the value to 1.0. Then the rest of the points of the model are multiplied by the same factor.

The result is a new model that better estimates the variations in the atmospheric density. The problem is that the original model assumed that the density was constant over time. So, although this new model is a better estimate of the atmospheric density changes, it may still have some biases as a result of the initial assumptions. Therefore the process is repeated again except that this new model is used as the starting estimate of the atmospheric variations instead of the model that is constant over time. This is done in an iterative fashion until the model does not change significantly from one iteration to the next.

Once the model has stabilized in the iteration stage, each satellite can be compared to see how well it fits the model. For each satellite, the observations can be scaled by their last computed $F_i$, compared to the model and a standard deviation can be computed. Satellites that agree well with the model probably have a fairly constant ballistic coefficient B, but satellites that have a larger standard deviation probably have a ballistic coefficient that changes over time (possibly a satellite that does not always have the same face in the direction of the velocity vector.) The changes in B cause B*'s of that satellite not to follow the model as closely.

As long as several satellites agree closely with one another in the variations over time, the satellites with very large standard deviations can be thrown out as satellites that have widely varying ballistic coefficients or satellites that do a lot of maneuvering. To obtain a more accurate model the process above can be repeated without using data from the satellites that appear to have widely varying ballistic coefficients.

Figure 3:
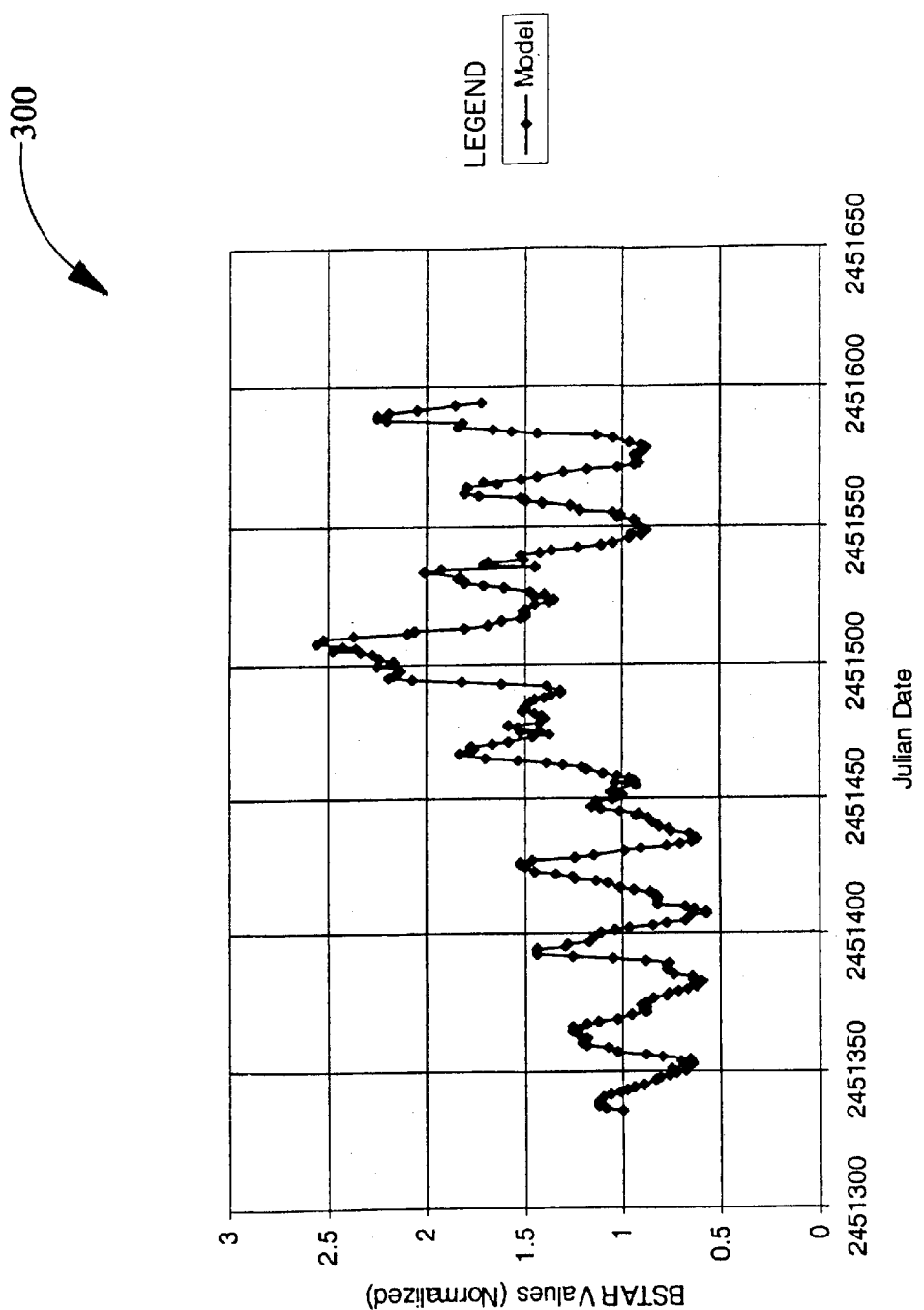
FIG. 3 is a chart of atmospheric density of normalized BSTAR values.

This model now contains information on relative changes in the atmosphere. For example, the atmospheric density at the end of the model in FIG. 3 is about 1.7 times greater than at the beginning of the model. However, given the ballistic coefficient of a known satellite, the actual atmospheric density, not relative density, could be determined instead of just relative changes. In addition, ballistic coefficients for other satellites could then be estimated.

The advantage of this new process is that an atmospheric model can be easily generated using observations of parameters derived directly from the region of the atmosphere that is of interest. It is not necessary to rely on indirect measurements near the ground.

This method has been developed using NORAD TLE's but many other types of drag estimates could be used to develop a similar model. Also, instead of developing a model that just estimates relative changes in the atmosphere, the data from known satellites could be incorporated into the model to scale the model to an absolute level of atmospheric density estimates.

Figure 4:
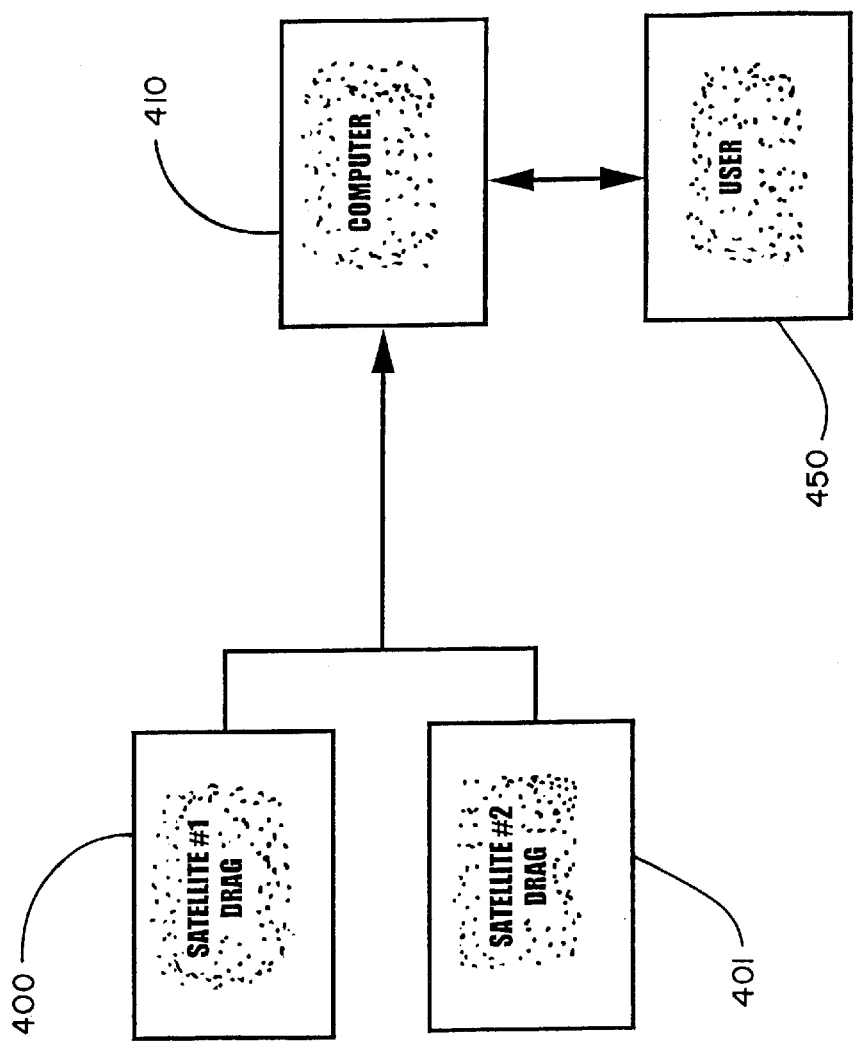
FIG. 4 is a block diagram of the computer system elements of the invention.

FIG. 4 shows the computer elements of the present invention. More specifically the invention uses readily available estimates of drag of satellites 400 and 401 by a computer 410 to form a model of atmospheric density changes using the algorithms described above.

Changes in atmospheric density are easily seen by plotting data from TLE sets, but the data is noisy and generally has many gaps in it. This new process presents a way in which data from several different satellites can be scaled to the same level and merged to form a much better model without gaps and solutions where noise values are averaged to reduce their effects. This results in a model that describes the relative changes in the atmospheric density over time. The absolute density is not modeled in this step, however, using satellites with well know drag properties, the model can be calibrated to give estimates of absolute atmospheric density if necessary. Along with the absolute values, the drag coefficients of all the satellites involved can be estimated.

This is a potentially better model of the atmospheric density than other models, because it is a direct observation of the atmospheric density's effects instead of estimating the density based on less direct measurements.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A process for modeling atmospheric density variations, said process comprising the steps of:

gathering data on effects of drag on satellites; and using a computer model to determine an estimate of upper altitude atmospheric density, when said computer is programmed to recognize a satellite's ballistic coefficient, B, is defined as:

$$B = \frac{C_D A}{m}$$

where $C_D$ is a coefficient of drag, A is a cross sectional area and m is mass, and a B* term is then defined as:

$$B^* = \frac{B}{2}\rho_0$$

where $\rho_0$ is a value of the atmospheric density at a reference altitude.

* * * * *